United States Patent

Månsson et al.

[11] Patent Number: 5,509,863
[45] Date of Patent: Apr. 23, 1996

[54] TRANSMISSION DEVICE, ESPECIALLY FOR BOAT MOTORS

[75] Inventors: Staffan Månsson, Hjälteby; Benny Hedlund, Hönö, both of Sweden

[73] Assignee: AB Volvo Penta, Gothenburg, Sweden

[21] Appl. No.: 204,272

[22] PCT Filed: Sep. 11, 1992

[86] PCT No.: PCT/SE92/00627

§ 371 Date: Mar. 8, 1994

§ 102(e) Date: Mar. 8, 1994

[87] PCT Pub. No.: WO93/05317

PCT Pub. Date: Mar. 18, 1993

[30] Foreign Application Priority Data

Sep. 12, 1991 [SE] Sweden ................................ 9102646

[51] Int. Cl.⁶ ....................................................... F16H 3/14
[52] U.S. Cl. ............................. 475/273; 475/336; 74/378; 74/665 H
[58] Field of Search .......................... 74/665 F, 665 H, 74/378; 475/269, 273, 336

[56] References Cited

U.S. PATENT DOCUMENTS 4,267,749  5/1981  Chambers et al. ................. 74/378 X
4,276,034  6/1981  Kashmerick ........................ 74/378 X

FOREIGN PATENT DOCUMENTS 0024100  2/1981  European Pat. Off..
0076591  4/1983  European Pat. Off..

Primary Examiner—Charles A. Marmor
Assistant Examiner—Peter Kwon
Attorney, Agent, or Firm—Young & Thompson

[57] ABSTRACT

Transmission for boats, comprising an input shaft (2), a reversing mechanism and an output shaft (3). The reversing mechanism is comprised by a right angled bevel gearing with two bevel gears (7, 8), which are freely rotatably mounted on an intermediate shaft (4) and engaged with a bevel gear (6) on the input shaft. The bevel gears (7, 8) each cooperate with an individual clutch (13, 14) respectively, by which one of the bevel gears can be locked to the intermediate shaft. The clutches (13, 14) are placed outside the bevel gearing, i.e. on the sides of the bevel gears (7, 8) facing away from each other in order to place the bevel gears (7, 8) close to each other. The clutches are wet clutches compressible by a piston (19) that moves in a cylinder (20) which in turn communicates with a hydraulic pump (22) driven by one of the input and intermediate shafts (2, 4). The output shaft (3) is driven by a bevel gear (12) having a recess in which one (14) of the clutches is partially received. The axis of the output shaft (3) intersects the axis of the intermediate shaft (4) at a point encircled by that latter clutch (14).

7 Claims, 3 Drawing Sheets

TRANSMISSION DEVICE, ESPECIALLY FOR BOAT MOTORS

FIELD OF THE INVENTION

The present invention relates to a transmission device, especially for boat motors, comprising a pair of intersecting shafts, drivingly connected to each other by means of at least one pair of bevel gears, a reversing mechanism driven by said shafts and having hydraulically operated multi-disk clutch means, by means of which the rotational direction of an output shaft is reversible.

BACKGROUND OF THE INVENTION

In a transmission device, known now for many years, for boat motors, an input shaft drives via a double bevel gearing, an intermediate shaft, which in turn via an additional bevel gear mechanism, drives an output shaft, which can either be the propeller shaft itself or be provided with the flange intended to be coupled to a propeller shaft. The reversing mechanism is integrated into the bevel gear mechanism by it having two freely rotatably mounted bevel gears which can be automatically locked by means of clutch means to the intermediate shaft and which engage a bevel gear on the input shaft.

The clutch means used were inter alia cone clutches, comprising a double clutch cone displaceable on the intermediate shaft between the bevel gears, whereby the clutch cone is displaceable into engagement with a facing conical clutch surface on the respective bevel gear. The displacement of the clutch cone was achieved mechanically and special mechanical devices utilizing the rotation of the shaft were used to overcome the tendancy to self locking which occurs in such clutches and which can create problems with disengagement, especially at high motor torque.

There have recently been developed hydraulically operated multi-disk clutches for locking and releasing the gears in the reversing mechanism. Such an arrangement shown in EP-A-295 569. Two bevel gears on an input shaft are alternately engageable with the shaft to drive an output shaft, which has a bevel gear in engagement with the two gears on the input shaft. The halves of the clutch cooperating with the respective gears are integrated into a unit which is placed between the freely rotatably mounted gears, i.e. near the point of intersection of the rotational axis of the shafts. The use of hydraulically operated clutches instead of mechanically operated cone clutches makes it possible to control engagement smoothly even at very high power, thus eliminating the risk of self locking.

The design of the known multi-disk clutch as a double clutch placed between the releasable gears in the same place as the known cone clutches creates however problems. This is due to the fact that the arrangement requires more space in the axial direction than the cone clutch arrangement, and this means that the gears in the bevel transmission must be made with larger radial dimensions and this makes the entire transmission device with associated housing heavier, more expensive and more space consuming.

SUMMARY OF THE INVENTION

The purpose of the present invention is to achieve in a transmission device of the type described by way of introduction with multi-disk clutches, an arrangement which enables the entire transmission device to be made lighter, less expensive and more compact than the above described known transmission device. This is achieved according of the invention by virtue of the fact that the multi-disk clutch means are arranged on the side of at least one bevel gear facing away from the point of intersection between the rotational axis of the first mentioned shafts.

In such a transmission device, the clutch means are moved from a location where they interfere with the gears of the bevel gearing to a location outside the double bevel gearing, which means that they will not effect the dimensioning of the bevel gears. Thus they only need be dimensioned with regard to stresses, and in practice this will mean that their diameter can be substantially reduced compared with transmissions with the clutch between the double gears.

BRIEF DESCRIPTION OF THE DRAWINGS

The invention will be described in more detail below with reference to examples shown in the accompanying drawings, where.

DESCRIPTION OF TEE PREFERRED EMBODIMENTS

Figure 1:
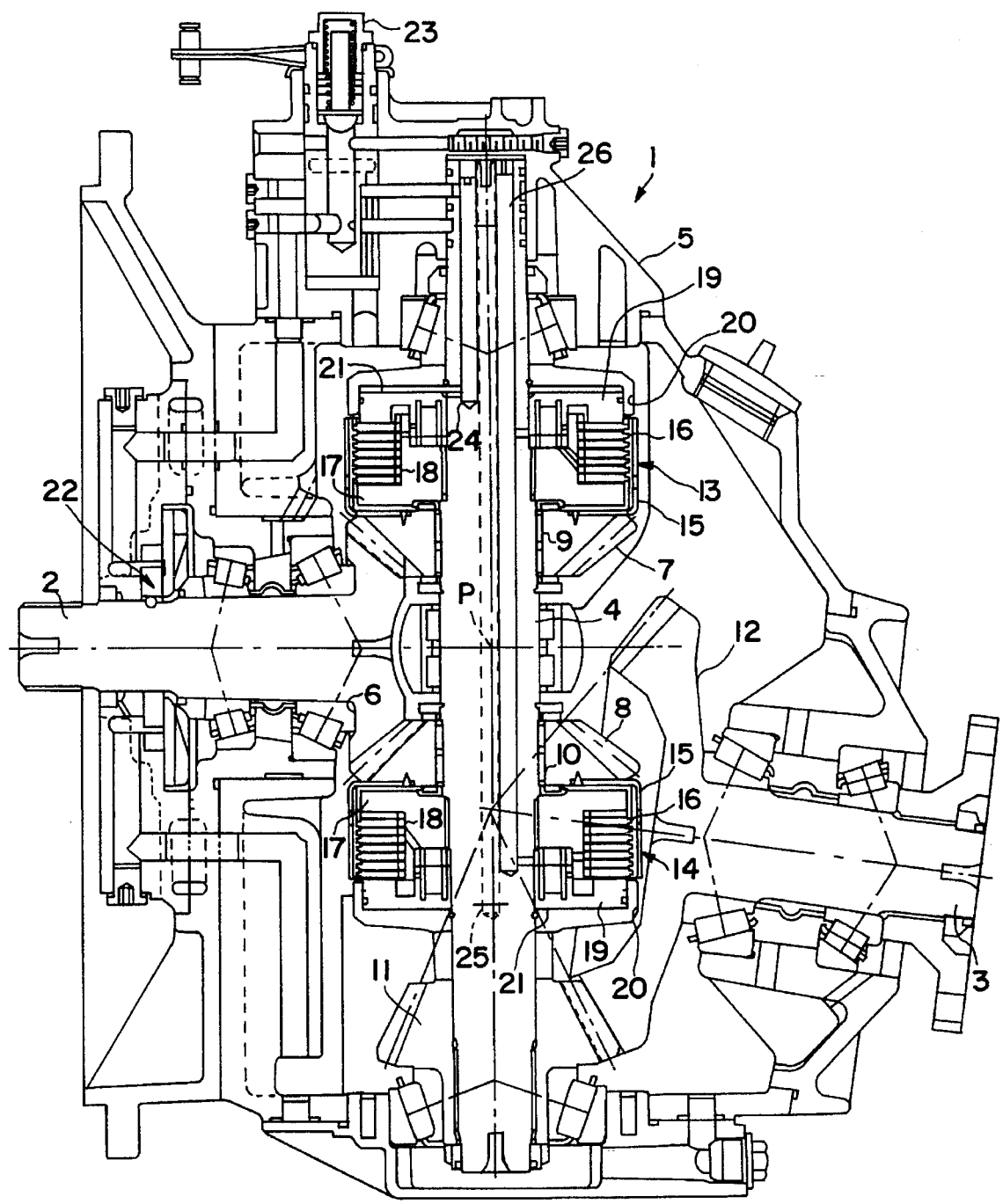
FIG. 1 shows a longitudinal section through a first embodiment of a transmission device according to the invention.

In FIG. 1, 1 designates a reversing transmission for a boat motor insulation of purely inboard type. The transmission has an input shaft 2 designed to be coupled to the crank shaft (not shown) of the motor and an output shaft 3 designed to be coupled to a propeller shaft (not shown). The shafts 2, 3 and an intermediate shaft or secondary 4 shaft are mounted in a housing 5. The input shaft is provided with a bevel gear 6 engaging 2 double gears 7 and 8, which are mounted on needle bearings 9 and 10 respectively on the intermediate shaft. A bevel gear 11 keyed to the intermediate shaft 4 engages a bevel gear 12 integral with the output shaft 3.

The bevel gears 7 and 8 respectively rotatably mounted on the intermediate shaft 4 cooperate with individual clutch devices 13 and 14 respectively. The clutches 13 and 14 are mirror imaged but otherwise identical, and therefore identical components have been given the same reference numerals. Gear 7 and 8 are each solidly joined on their sides facing away from each other to individual bowl shaped elements 15 with which a number of clutch disks 16 are non-rotatably but axially displaceably joined. The disk carrier 17 is non-rotatably joined to the intermediate shaft 4 and carries non-rotatable displaceable disks 18. A hydraulic piston 19 is disposed on one side of each package of disks and delimits together with a cylinder element 20 a chamber 21 for hydraulic fluid. The respective gear 7, 8 is locked to the intermediate shaft 4 by pressurizing the associated chamber 21 so that its piston 19 compresses the disk package in the example shown in FIG. 1, the upper clutch 13 of the bevel gear 7 is engaged, so that torque is transmitted via this bevel gear, while the lower clutch 14 is disengaged. Hydraulic fluid is supplied to the respective chamber 21 by a hydraulic pump 22 driven by the input shaft 2 via a control valve 23 and channels 24 and 25 in the intermediate shaft 4. The clutches 13, 14 are of wet disk type, and are provided with fluid via a channel in the intermediate shaft 4. When reversing the rotational direction of the output shafts 3, the upper clutch 13 is released, whereafter the lower clutch 14 is engaged.

As can be seen in FIG. 1, the embodiment described with two clutch units 13, 14 placed outside the double bevel gearing, i.e. outside the point of intersection P of the rotational axes allows the gears 7, 8 to be arranged with a small axial spacing on the intermediate shaft, and this means that the radius of the bevel gears is only determined by the stresses which the gearing must be dimensioned for, and this in turn means that the double bevel gearing can be made very compact.

Figure 2:
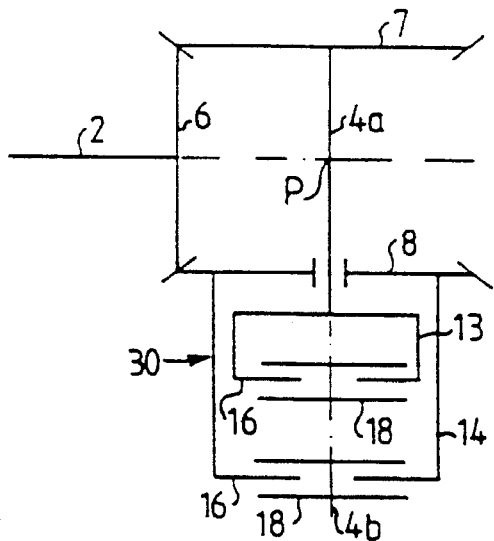
FIGS. 2–5 are schematic diagrams of four other embodiments of a transmission device according to the invention.

FIG. 2 shows an embodiment of a transmission according to the invention in which the clutches 13 and 14 are consolidated into a single unit 30, which is placed below the lower bevel gear 8. The upper bevel gear 7 is in this case non-rotatably joined to a shaft end which forms a part 42 of an intermediate shaft 4a, 4b and is rotatable relative to part 4b. The upper bevel gear 7 is lockable by means of the clutch portion 13 to the axial portion 4a, while the lower bevel gear 8, which is rotatably mounted on the shaft portion 4a can be locked relative the shaft portion 4b by means of the clutch portion 14. The rest of the components in FIG. 3 corresponding to these in FIG. 1 have been given the same reference numerals as in FIG. 1.

Figure 3:
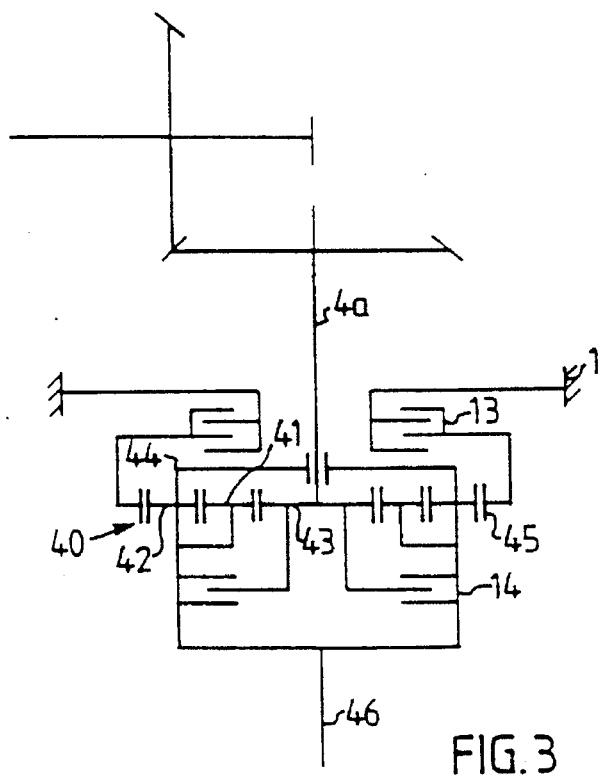

In FIG. 3, the bevel gear 6 engages the input shaft 2 which has a single bevel gear 8 which is non-rotatably fixed to a shaft portion 4a. In this case the reversing gear is provided in the form of a planetary transmission 40 with double planetary gear sets 41 and 42, by means of which the rotational direction of the shaft portion 46 can be reversed. The shaft portion 4a drives the sun pinion 43 of the planetary transmission and can be locked by means of the clutch 14 to the planetary gear carrier 44 to lock the shaft portions 4a and 4b together into a unit. By means of this other clutch 13, the ring gear 45 of the planetary transmission can be locked to the housing 1 to reverse the rotational direction of the shaft portion 4b relative to the shaft portion 4a.

Figure 4:
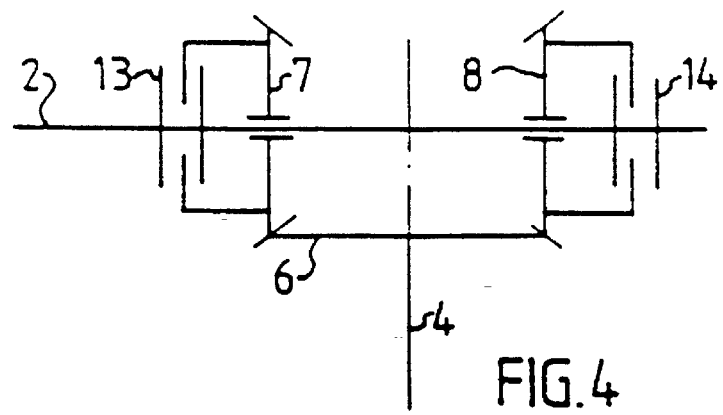

FIG. 4 shows an embodiment which distinguishes from that shown in FIG. 1 only in that the two releasable bevel gears 7 and 8 with associated clutches 13, 14 are mounted on the input shaft 2 while the bevel gear 6 is fixed to an intermediate shaft 4.

The transmission according to the invention can be included in a module system of the type described in SE-A-417 075, and thus be used both in entirely inboard installations of the design shown in FIG. 1 and for outboard drive units of the Aquamatic® type. Especially in the latter type, it is desirable to keep dimensions and weight at as low a level as possible.

Figure 5:
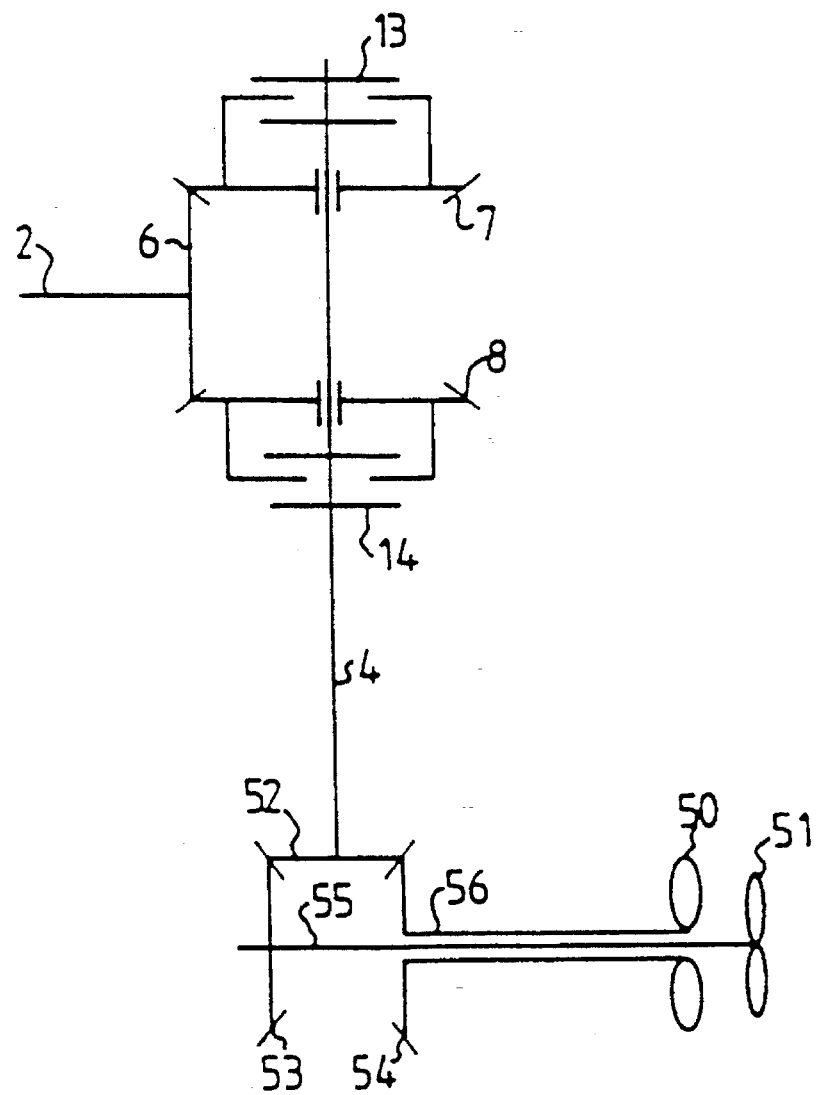

Such an outboard drive unit for double counter rotating propellers 50, 51 is shown in FIG. 5.. Components with counterparts in FIG. 1 have been given the same reference numerals as in FIG. 1. The intermediate shaft 4 drives via bevel gears 52, 53 and 54 two counter-rotating propeller shafts 55, 56.

I claim:

1. In a transmission device in an outboard drive unit for boats, comprising a first shaft having a first bevel gear wheel non-rotatably fixed on the shaft and a second shaft the rotational axis of which intersects the rotational axis of the first shaft and having two bevel gear wheels rotatably journalled on the second shaft and lockable on the second shaft by means of clutch means, said two gear wheels meshing with the first gear wheel, one of said shafts being an input shaft adapted to be connected to an engine, the other shaft being an intermediate shaft having a gear wheel meshing with a gear wheel on an output shaft; the improvement wherein the clutch means (13, 14) are multi-disk clutch means which are disposed outside a space formed between the rotatably journalled gear wheels (7, 8), the multi-disk clutch means (13, 14) being wet multi-disk clutches having disk packets compressible by a piston (19) for each packet, said piston being displaceable in a cylinder (20), which via an operating valve (23) communicates with a hydraulic pump (22) driven by one of said input and intermediate shafts (2, 4).

2. Transmission device according to claim 1, wherein the clutch means are formed by two individual multi-disk clutches (13, 14) arranged on the sides of the respective bevel gears, facing away from each other.

3. Transmission device according to claim 1, wherein the clutch means are formed by two multi-disk clutches (13, 14) each joined to a freely rotatably mounted bevel gear, said multi-disk clutches forming a consolidated unit (30) on one side of one (8) of said bevel gears.

4. Transmission device according to claim 1, wherein said hydraulic pump communicates with said clutches lengthwise along the interior of said intermediate shaft (4).

5. In a transmission device in an outboard drive unit for boats, comprising a first shaft having a first conical gear wheel non-rotatably fixed on the shaft and a second shaft the rotational axis of which intersects the rotational axis of the first shaft and having two conical wheel gears rotatably journalled on the second shaft and lockable on the second shaft by means of clutch means, said two gear wheels meshing with the first gear wheel, one of said shafts being an input shaft adapted to be connected to an engine, the other shaft being an intermediate shaft having a gear wheel meshing with a gear wheel on an output shaft; the improvement wherein said gear wheel on said output shaft is a bevel gear having a hollow into which extends a portion of one (14) of said clutch means.

6. Transmission device according to claim 5 wherein said output shaft (3) and said intermediate shaft (4) have axes that intersect at a point encircled by said one (14) clutch means.

7. In a transmission device in an outboard drive unit for boats, comprising a first shaft having a first bevel gear wheel non-rotatably fixed on the shaft and a second shaft the rotational axis of which intersects the rotational axis of the first shaft and having two bevel wheel gears rotatably journalled on the second shaft and lockable on the second shaft by means of clutch means, said two gear wheels meshing with the first gear wheel, one of said shafts being an input shaft adapted to be connected to an engine, the other shaft being an intermediate shaft having a gear wheel meshing with a gear wheel on an output shaft; the improvement wherein said output shaft (3) and said intermediate shaft (4) have axes that intersect at a point encircled by said one (14) clutch means.

* * * * *